United States Patent

Little et al.

[15] 3,646,818
[45] Mar. 7, 1972

[54] COMPENSATED OUTPUT SOLID-STATE DIFFERENTIAL ACCELEROMETER

[72] Inventors: Little J. Little; Joe S. Hunter, both of Huntsville, Ala.

[73] Assignee: The United States of America as represented by the Secretary of the Army

[22] Filed: Jan. 8, 1970

[21] Appl. No.: 1,481

[52] U.S. Cl. ..........................................................73/517 R
[51] Int. Cl. .....................................................G01p 15/08
[58] Field of Search.................73/516, 517, 497; 317/235 M

[56] References Cited

UNITED STATES PATENTS

| | | | |
|---|---|---|---|
| 3,392,576 | 7/1968 | Hollander, Jr. | 73/517 X |
| 3,386,292 | 6/1968 | Watson et al. | 73/517 AV |
| 3,403,307 | 9/1968 | Rindner | 317/235 M |
| 3,512,054 | 5/1970 | Owada et al. | 317/235 M |

*Primary Examiner*—James J. Gill
*Attorney*—Harry M. Saragovitz, Edward J. Kelly, Herbert Berl and Harold W. Hilton

[57] ABSTRACT

A solid-state differential accelerometer employing piezotransistors for measuring acceleration or velocity of a body along a specified axis of the accelerometer. A pair of substantially identical piezotransistors are arranged back-to-back along the axis through which tension and compression forces of acceleration are applied. A piezoelectrical emitter-base junction of each transistor is mechanically linked to a diaphragm portion of the transistor case that is normal to the acceleration axis. A force transferring bar links the outer surface of the transistor case diaphragm with a pliable surface of a nickel alloy protective housing of each transistor, the bar being aligned along the acceleration or force axis. The pliable housing surfaces are held together by a support ring and maintain the physical arrangement of the transistors back-to-back. A change in velocity along the force axis causes an opposing reaction by the pliable surfaces which convey changes through the force transferring bar to flex the piezotransistor diaphragms, stressing the emitter-base junction of each transistor.

In related electrical circuitry, the piezotransistors have collector outputs coupled to noninverting and inverting terminals of a differential amplifier. The emitters are coupled through a common current source which allows constant conduction through the piezotransistors. Acceleration forces coupled to the transistors produces a change in output voltage proportional to the specific force input over the linear range of operation. The predominant error-producing quadratic term and the bias component of the signal are canceled and the linear output is doubled without additional amplification.

5 Claims, 3 Drawing Figures

PATENTED MAR 7 1972                                      3,646,818

Little J. Little
Joe S. Hunter,
INVENTORS.

BY Harry M. Sarognetz
Edward J. Kelly
Herbert Berl
Harold W. Hilton

COMPENSATED OUTPUT SOLID-STATE DIFFERENTIAL ACCELEROMETER

BACKGROUND OF THE INVENTION

In transducers employing the piezoelectric effect to indicate acceleration, the direct effect of mechanical stress applied to the transducer or sensor produces a change in the electrical charge on the faces of asymmetric crystals. Thus, tension or compression applied to the crystal generates a static voltage or voltage change across the crystal that is proportional to the stress or strain applied.

In obtaining accurate sensors and measurements therefrom, not only are highly reliable and accurate electrical circuits required, but the overall packaged instrument must be protected from varying environmental conditions. Typical of the environmental conditions is broad temperature differentials and rapid change from one temperature to the other, and constant exposure to shock or vibration. Packaging of relatively accurate accelerometer sensors in small volumes results in a rather high unit cost. There is a considerable gap in technology in the area of medium accuracy characteristic and low-cost accelerometers and in package volume thereof.

SUMMARY OF THE INVENTION

The apparatus of the present invention is a device for measuring the rate of change of velocity and producing an output voltage proportional thereto. The compensated output solid state differential accelerometer can be fixed to a missile body or other movable structure to provide velocity information in the direction of flight path, or in the direction wherein a monitor is required.

A pair of stress sensors are arranged in a back-to-back configuration and housed in a protective housing having a low temperature coefficient of expansion. The stress sensors are arranged coaxially with the direction in which acceleration forces are to be measured. Axial acceleration forces cause tension and compression to be exerted on respective sensors. An electrical response to these forces is coupled from each sensor to a differential signal detector wherein one of the response signals is inverted before the difference is obtained. Due to the characteristics of positive and negative acceleration forces, tension and compression, the predominant error-producing quadratic and bias component are canceled and the accurate linear output is doubled. This yields a stronger signal measurement that additionally overcomes inherent noise generations (such as vibrations) without amplification of the signal before application to integrators or other using circuitry.

An object of the present invention is to provide an accelerometer that produces an output proportional to the specific force input over the linear region of operation while canceling error-producing signal components.

Another object of the present invention is to provide an efficient accelerometer having a sensing element packaged in a small volume.

DESCRIPTION OF THE PREFERRED EMBODIMENT

Figure 1:
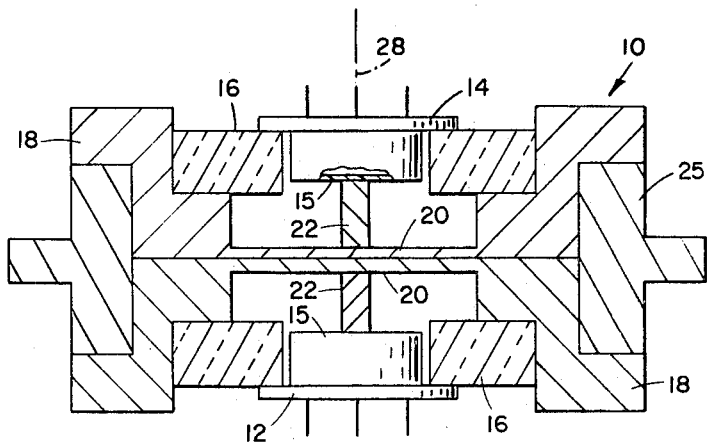
FIG. 1 is a sectional view of the piezoelectrical sensing element.
Figure 2:
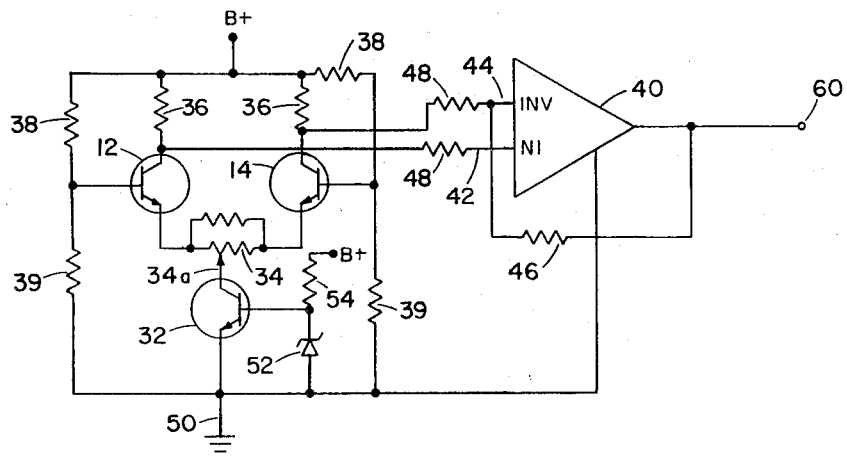
FIG. 2 is a schematic of the sensing element and related circuitry.

Referring now to the drawings wherein like numerals represent like parts in all figures, there is disclosed a preferred embodiment of the invention in FIGS. 1 and 2. FIG. 1 discloses a sensing element 10 having two piezotransistors or sensors 12 and 14 arranged in a back-to-back configuration. Transistors 12 and 14 are housed in separate and substantially identical support structures. A quartz mounting ring 16 encompasses the circumference of transistor 12, being attached to the base structure of the transistor. A nickel alloy housing 18, invar case, forms a partially cylindrical structure or case around ring 16, being open at one end thereof and having the other end closed by a pliable or flexible alloy housing portion. This flexible portion of housing 18 serves as a diaphragm 20. A proofmass 22 provides a rigid link between the top 15 of transistor case 12 and the top or diaphragm 20 of housing 18. Proofmass 22 is a mass that attempts to stay inertially fixed, resisting change, and may be a cylindrical rod fixed between structures 12 and 20, for example. Quartz ring 16 provides compensation for mismatch between accelerometer housing 18 and proofmass 22 thermal expansion coefficients due to unequal lengths. Quartz ring 16 has a much lower coefficient of thermal expansion than the nickel alloy of housing 18. The combined expansion of these elements, housing 18 and ring 16, is set equal to the expansion of proofmass 22, thereby preventing undesired stresses being applied to piezotransistors 12 or 14. Ring 16 also supports and protects the transistor.

Transistor 14 is supported and housed by similar structures including a quartz ring 16, housing 18, diaphragm 20 of housing 18 and proofmass 22. The diaphragms 20 of the respective housings are placed in mutual contact with proofmasses 22 arranged substantially coaxial. An interface ring 25, having substantially the same coefficient of expansion as housing 18, circumferentially encompasses the upper or top portions of housings 18 to hold them in a fixed position with respect to each other. The nickel alloy, invar, is used in the construction of housing 18, interface ring 25 and proofmass 22. This alloy is principally noted for its very low coefficient of thermal expansion (less than 1 microinch per inch per degree Fahrenheit).

The top portion 15 of piezotransistors 12 and 14 form one side portion of respective diaphragms within each transistor. The top portion or diaphragm 15 is coupled to the transistor emitter-base junction (not shown). Stress signals that flex the top of either transistor are coupled to the emitter-base junction thereof, stimulating a piezoelectric direct effect. When accelerometer 10 has an acceleration force exerted thereon, transistor diaphragms 15, proofmasses 22 and housing diaphragm 20 attempt to move against the acceleration thrust vector, along axis 28. Thus, placing one transistor diaphragm 15 in tension and the other diaphragm 15 in equal but opposite compression. Force can be applied in either direction along axis 28 and overall system performance is unaffected, due to reversible response capability of the piezotransistor.

The electrical circuitry of the solid state differential accelerometer, shown in FIG. 2, includes piezotransistors 12 and 14 and a third transistor 32. The emitters of transistors 12 and 14 are connected together through a variable resistance 34. Collector load resistors 36 and base biasing resistors 38 connect the base and collector of transistors 12 and 14 to a common positive voltage source B+. The collector of transistor 12 is connected as the noninverting input 42 of a differential amplifier 40 and the collector of transistor 14 is connected as the inverting input 44 of amplifier 40. A resistor 46 provides feedback from the output of amplifier 40 to the inverting lead 44 and input resistors 48 establish the gain ratio of the amplifier. The bases of transistors 12 and 14 are further connected through respective resistors 39 to system or circuit ground 50. A zener diode 52 and voltage dropping resistor 54 combine with transistor 32 to provide a constant current source for transistors 12 and 14. The anode of diode 52 is connected to ground and to the emitter of transistor 32. The cathode of diode 52 is connected to the base of transistor 32 and through resistor 54 to B+. The collector of transistor 32 is connected to the variable arm 34a of variable resistor 34. The circuit ground 50 is further connected to amplifier 40. Amplifier 40 has an output terminal 60 that connects an output signal to using circuitry such as integrators for measuring velocity.

In operation, accelerometer 10 may be aligned along the flight axis of a missile. The sensitive axis 28 or longitudinal axis of the accelerometer is coaxial with proofmass 22 and normal to the plane of diaphragms 20. The application of a specific force along sensitive axis 28 results in a tension being exerted on one transistor diaphragm 15 and compression being exerted on the other diaphragm 15. A large reversible change is produced in the output characteristics when a force is applied to the emitter-base junction of each transistor. An unamplified linear output of approximately 20 percent of the supply voltage is achieved at the nominal maximum force input. The output signal is proportional to the specific force input over the linear region of operation.

Diode 52 and resistor 54 maintain the base of transistor 32 at a fixed potential and transistor 32 is held in a conductive state. Transistors 12 and 14 are conductively biased, conducting through trim resistance 34 and transistor 32. Any unbalance in the system is indicated as an output signal on terminal 60 of amplifier 40. Before operation, this output signal is nulled to zero by adjusting variable resistance 34 so that the collector signal on transistors 12 and 14 is identical. When a force is exerted along the sensitive or longitudinal axis of accelerometer 10 the output voltages of transistors 12 and 14 change with respect to the tension or compression thereon. The differential signals on the collectors of transistors 12 and 14 are coupled through resistors 48 to inputs 42 and 44 respectively of amplifier 40 wherein algebraic summing is provided. By inverting one input of amplifier 40 the bias and quadratic nonlinearity coefficients are cancelled and the useful linear output is doubled. Amplifier 40 provides a low impedance output at terminal 60 for connection to using circuitry.

Figure 3:
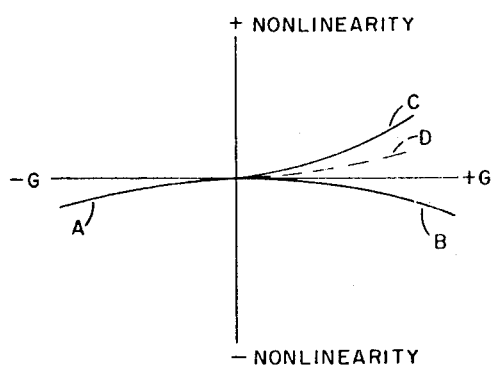
FIG. 3 is a graph illustrating the cancellation effect of error-producing terms by the sensor arrangement of FIG. 1.

With reference to FIG. 3 and assuming acceleration of accelerometer 10 along the sensitive axis 28. Assuming transistor 12 to be in the fore position, transistor 12 is in tension and transistor 14 is in compression. The horizontal axis of FIG. 3 represents the degree of acceleration in the positive or negative direction and the vertical axis represents the amount of nonlinearity of the transistor output signal with increasing degrees of acceleration. Curve A is the cubic and quadratic composite output of piezotransistor 14, which is subjected to negative acceleration. Curve B is the inverted representation of curve A performed by the inverting input of amplifier 40. Curve C is the cubic and quadratic composite output of piezotransistor 12, exposed to positive acceleration. Curves A and C are representative of the outputs of stress sensitive transistors in response to stresses applied to the emitter-base junction thereof. Curve D is the algebraic summation of curves B and C. In mathematical notation, the output (A) corresponding to curve A is written as $$K_0 + K_1(-a) + K_2(-a)^2 + K_3(-a)^3 + \ldots + K_n(-a)^n = A$$

or $$K_0 - K_1 a + K_2 a^2 - K_3 a^3 + \ldots + K_n(-a)^n = A$$

where $K_0$ = Accelerometer bias term
$K_1$ = Scale factor
$K_2$ = Quadratic nonlinearity coefficient
$K_3$ = Cubic nonlinearity coefficient
$K_n$ = $n^{the}$ order nonlinearity coefficient, and
$a$ = Applied acceleration.

Since terms beyond the quadratic coefficient contribute very little to overall nonlinearity, the equation representing curve A is truncated with the $K_2$ coefficient and is written as $$K_0 - K_1 a + K_2 a^2 = A. \quad (1)$$

Inverting this equation results in the equation for curve B, $$-K_0 + K_1 a - K_2 a^2 = B. \quad (2)$$

Similarly, the truncated equation for curve C is represented by, $$K_0 + K_1 a + K_2 a^2 = C. \quad (3)$$

Summing the last two equations algebraically results in an output equal to, $$2 K_1 a.$$

Thus, both the bias and the quadratic nonlinearity coefficient are cancelled and the useful linear output is doubled.

A working model of this circuit can be constructed with the nickel alloy components formed of UNISPAN LR—35 and having the following typical component values:

| | |
|---|---|
| Transistors 12, 14 | PITRAN Model PT-3 |
| Transistor 32 | Motorola 2N2222 |
| Amplifier 40 | Fairchild 709 |
| Resistors 38 | 68K ohms |
| Resistors 36 | 75K ohms |
| Resistors 39 | 3.3K ohms |
| Resistors 48 | 10K ohms |
| Resistor 46 | 100K ohms |
| Resistor 34 | 100 ohm Potentiometer with 5K ohm bridge. |

The compensated output solid-state differential accelerometer produces an output voltage which is proportional to rate of change of velocity. The accelerometer can be fixed to a missile body or other body to provide velocity information therefor in a specific direction. If it is desired to measure accelerations along a lateral plane, the accelerometer can be mounted on a stabilized platform. By stabilizing such a platform with three gyros, effective along the yaw, roll and pitch axes, its direction in space can be controlled. With this typical arrangement, it is possible to utilize the accelerometer along longitudinal and lateral axes to determine either velocity by a single integration or distance travelled by two successive integrations. The accelerometer can be used to provide data for cutting off a rocket motor at the desired point in a flight trajectory. It can be mechanized to make very accurate gravity measurements, and can also be used as an axes leveling device in north-seeking platform applications.

We claim:

1. A solid-state differential accelerometer for measuring acceleration of a body along the sensitive or longitudinal axis of said accelerometer, comprising: first and second piezotransistors having respective output electrodes and arranged in a back-to-back configuration along said sensitive axis, said piezotransistors being housed in respective protective containers, said containers each having a diaphragm wall portion thereof; first and second housing means having a pliable surface area and partially encompassing said first and second piezotransistor containers respectfully; first and second force transmitting proofmasses respectively connecting the diaphragm wall portion of said first and second piezoelectric containers to the interior of said pliable surface of said first and second housing means for applying pressure to said piezotransistors in response to acceleration forces, said pliable surface and container diaphragm wall portion being arranged normal to said sensitive axis, said proofmasses being coaxially aligned along said sensitive axis; and a differential amplifier having an inverting and a noninverting input connected respectively to said output electrodes of said first and second piezotransistors, and an output for connection to indicating or using circuitry.

2. An accelerometer as set forth in claim 1 wherein each of said housing means is a nickel alloy, and further comprising an additional nickel alloy ring around the circumference of said first and second housing alloys for maintaining said housings pliable surfaces in mutual contact and thereby allowing acceleration forces along said longitudinal axis to exert tension on one electron device container and compression on the other simultaneously.

3. An accelerometer as set forth in claim 2 and further comprising a quartz mounting ring around the circumference of each of said piezotransistor containers for protection and support thereof, said containers being adjacent the inner surface of said rings and said housing being fixed to the outer surface of said rings.

4. An accelerometer as set forth in claim 3 wherein said pizeotransistors are NPN-planar transistors and further comprising a variable resistance connected between the emitters of said transistors, a constant current source connected through said variable resistance to said emitters, a power source connected respectively through load and bias resistors to the collector and base of said transistors, and said output electrodes being the collector of each of said transistors.

5. An accelerometer as set forth in claim 4 wherein said constant current source is a third NPN-transistor having the collector connected to said variable resistance, the base connected through a resistance to said power source, and a zener diode connected in reverse between the base and emitter thereof and said emitter being further grounded to a circuit common.

* * * * *